US012502959B2

(12) United States Patent
Zhong et al.

(10) Patent No.: US 12,502,959 B2
(45) Date of Patent: Dec. 23, 2025

(54) DISPLAY DEVICE, VEHICLE, AND METHOD FOR CONTROLLING VEHICLE

(71) Applicant: BYD COMPANY LIMITED, Guangdong (CN)

(72) Inventors: Yilin Zhong, Shenzhen (CN); Chunfen Wu, Shenzhen (CN); Jiang Huang, Shenzhen (CN); Jun Dai, Shenzhen (CN); Fengwu Su, Shenzhen (CN)

(73) Assignee: BYD Company Limited, Shenzhen (CN)

(*) Notice: Subject to any disclaimer, the term of this patent is extended or adjusted under 35 U.S.C. 154(b) by 0 days.

(21) Appl. No.: 18/619,801

(22) Filed: Mar. 28, 2024

(65) Prior Publication Data

US 2024/0239196 A1 Jul. 18, 2024

Related U.S. Application Data

(63) Continuation of application No. PCT/CN2022/139849, filed on Dec. 19, 2022.

(30) Foreign Application Priority Data

Dec. 30, 2021 (CN) .......................... 202111656373.0

(51) Int. Cl.
*B60K 35/22* (2024.01)
*B60K 35/65* (2024.01)

(52) U.S. Cl.
CPC ............ *B60K 35/22* (2024.01); *B60K 35/656* (2024.01); *B60K 2360/29* (2024.01);
(Continued)

(58) Field of Classification Search
CPC .. B60K 35/22; B60K 35/656; B60K 2360/29; B60K 2360/332; B60K 2360/333;
(Continued)

(56) References Cited

U.S. PATENT DOCUMENTS 10,427,602 B1 * 10/2019 Bertollini ................. G02B 5/32
12,265,357 B2 * 4/2025 Hart ..................... G03H 1/0248
(Continued)

FOREIGN PATENT DOCUMENTS

CN 102967999 A 3/2013
CN 203205055 U 9/2013
(Continued)

OTHER PUBLICATIONS

English Translation DE102019121048 (Year: 2019).*
(Continued)

*Primary Examiner* — Fernando Alcon
(74) *Attorney, Agent, or Firm* — Sheppard Mullin Richter & Hampton LLP

(57) ABSTRACT

A display device includes a beam generator and a holographic optical waveguide. The beam generator includes a display and is configured to generate beams having image information displayed on the display. The holographic optical waveguide is configured to display an image of a second size at a position at a first distance behind the display device based on the beams having the image information, the second size is a multiple of the first size of the display, and the multiple is greater than 1.

20 Claims, 6 Drawing Sheets

(52) U.S. Cl.
CPC .. *B60K 2360/332* (2024.01); *B60K 2360/333* (2024.01); *B60K 2360/336* (2024.01); *B60K 2360/77* (2024.01)

(58) Field of Classification Search
CPC .......... B60K 2360/336; B60K 2360/77; B60K 35/50; B60K 2360/149; B60K 2360/1523; B60K 35/23; B60K 2360/741; G02B 27/0101; G02B 27/0103; G02B 5/32; G02B 2027/0105; G02B 2027/0123; G02B 27/0172; G02B 6/0026; G02B 6/005; G02B 6/122; G02B 2027/0174
See application file for complete search history.

(56) References Cited

U.S. PATENT DOCUMENTS

| | | | | |
|---|---|---|---|---|
| 2018/0105114 | A1 | 4/2018 | Geerlings et al. | |
| 2020/0174255 | A1* | 6/2020 | Hollands | G02B 27/0103 |
| 2020/0292820 | A1* | 9/2020 | Lo | G02B 27/0172 |
| 2022/0269075 | A1* | 8/2022 | Yang | G02B 27/0103 |
| 2023/0118416 | A1* | 4/2023 | Hirata | B60K 35/10 |
| | | | | 359/630 |
| 2024/0029599 | A1* | 1/2024 | Chang | G02B 27/0103 |

FOREIGN PATENT DOCUMENTS

| | | | | |
|---|---|---|---|---|
| CN | 103605199 | A | 2/2014 | |
| CN | 204009229 | U | 12/2014 | |
| CN | 104267591 | A | 1/2015 | |
| CN | 104534980 | A | 4/2015 | |
| CN | 105137598 | A | 12/2015 | |
| CN | 106338832 | A | 1/2017 | |
| CN | 106338905 | A | 1/2017 | |
| CN | 107390380 | A | 11/2017 | |
| CN | 108957757 | A | 12/2018 | |
| CN | 110626266 | A | 12/2019 | |
| CN | 111474711 | A | 7/2020 | |
| CN | 111812841 | A | 10/2020 | |
| CN | 112297842 | A | 2/2021 | |
| CN | 113655615 | A | 11/2021 | |
| CN | 111149040 | B | 6/2022 | |
| DE | 102019121048 | A1 | 2/2021 | |
| EP | 1662782 | A1 | 5/2006 | |
| JP | 2005-067555 | A | 3/2005 | |
| JP | 2005311823 | A | 11/2005 | |
| JP | 2014-169022 | A | 9/2014 | |
| JP | 2015-134514 | A | 7/2015 | |
| JP | 2021-154998 | A | 10/2021 | |
| WO | WO-2005022904 | A1 * | 3/2005 | ......... B60R 11/0229 |
| WO | 2015/146359 | A1 | 10/2015 | |

OTHER PUBLICATIONS

International Search Report and Written Opinion for Application No. PCT/CN2022/139849, mailed on Mar. 7, 2023, 11 pages.
Examination Report No. 1 dated Feb. 13, 2025, issued in related Australian Patent Application No. 2022427452 (4 pages).
Extended European Search Report dated Dec. 23, 2024, issued in related European Patent Application No. 22914342.5 (7 pages).
Notice of Reasons for Refusal dated May 7, 2025, issued in related Japanese Patent Application No. 2024-513009, with English machine translation (15 pages).

* cited by examiner

DISPLAY DEVICE, VEHICLE, AND METHOD FOR CONTROLLING VEHICLE

CROSS-REFERENCE TO RELATED APPLICATIONS

The application is a continuation application of International Patent Application No. PCT/CN2022/139849 filed on Dec. 19, 2022, which is based on and claims priority to and benefits of Chinese Patent Application No. 202111656373.0, filed on Dec. 30, 2021. The entire content of all of the above-referenced applications is incorporated herein by reference.

FIELD

The present disclosure relates to the technical field of vehicles, and more particularly, to a display device, a vehicle, and a method for controlling a vehicle.

BACKGROUND

Currently, in some high-end cars, a display is mounted behind a front seat, to play videos for watching by a passenger on a rear seat, which improves a vehicle class, and provides entertainment to passengers on the rear rows. In addition, full-featured high-end cars have functions such as communication, mobile office, surfing the Internet, and supporting connection to external game consoles. In the related art, displays for rear rows are arranged/disposed at different positions, such as a position behind a headrest of a front seat (shown in FIG. 1), a position behind a backrest of a front seat, a position behind a central armrest, and a position on a roof over rear seats. The position behind the headrest of the front seat and the position behind the backrest of the front seat are the best positions for video watching. A size of a displayed image on a display for a rear row is about 12 inches. However, in the related art, an observation distance between human eyes and the display is about 650 mm. The distance is excessively short, and the human eyes are prone to visual fatigue and myopia when keeping looking at the small screen. In particular, when a vehicle shakes during driving, dizziness and discomfort are easily caused.

SUMMARY

A display device, a vehicle, and a method for controlling a vehicle are provided. Eye pupils do not need to be kept in a wide-open state that causes discomfort, which avoids fatigue and myopia. Experience like watching a TV series at home can be realized, and an image size can be increased without occupying more physical space of an entire vehicle.

According to a first aspect, the present disclosure provides a display device, which includes: a beam generator, comprising a display and configured to generate beams having image information displayed on the display, wherein the display has a first size; and a holographic optical waveguide, configured to display an image of a second size at a position at a first distance behind the display device based on the beams having the image information, wherein the second size is a multiple of the first size; and the multiple is greater than 1.

According to the display device in this embodiment of the present disclosure, the image of the second size is displayed, which increases an image size without occupying more physical space of an entire vehicle. The image is displayed at the position at the first distance behind the display device, which realizes whole experience like watching a TV series at home, and prevents eye pupils from being kept in a wide-open state that causes discomfort.

According to a second aspect, the present disclosure provides a vehicle, which includes the display device. The display device is arranged at a position on a headrest or a back of a front seat of the vehicle.

According to the vehicle in this embodiment of the present disclosure, through the display device, eye pupils do not need to be kept in a wide-open state that causes discomfort, which avoids fatigue and myopia; experience like watching a TV series at home can be realized; and an image size can be increased without occupying more physical space of an entire vehicle.

According to a third aspect, the present disclosure provides a method for controlling a vehicle. The vehicle includes a front seat, a rear seat, and the display device. The display device is arranged at a position on a headrest or a back of the front seat. The method includes the following steps. It is determined that the display device is in an operating state. Relative positions of the display device and eyes of a passenger on the rear seat are obtained according to positions and angles of the front seat and the rear seat. A position of at least one of the front seat and the rear seat is adjusted when the relative positions do not meet a condition.

According to the method for controlling a vehicle in this embodiment of the present disclosure, the holographic optical waveguide is adjusted by using a motor, to keep the relative positions of the display device and the eyes of the passenger on the rear seat unchanged. Therefore, eye pupils do not need to be kept in a wide-open state that causes discomfort, which avoids fatigue and myopia; experience like watching a TV series at home can be realized; and an image size can be increased without occupying more physical space of an entire vehicle.

Part of additional aspects and advantages of the present disclosure is provided in the following description. The part will be apparent from the following description, or is learned by practice of the present disclosure.

DETAILED DESCRIPTION

Figure 1:
FIG. 1 is a schematic diagram in which a display is arranged at a position behind a headrest of a front seat in the related art.

Embodiments of the present disclosure are described in detail below, and examples of the embodiments are shown in drawings. The same or similar elements or the elements having the same or similar functions are denoted by the same or similar reference numerals throughout the description. The embodiments described below with reference to the drawings are examples, and are to explain the present disclosure and cannot be understood as a limitation on the present disclosure.

A display device, a vehicle, and a method for controlling a vehicle in the embodiments of the present disclosure are described below with reference to FIG. 2 to FIG. 14.

Figure 2:
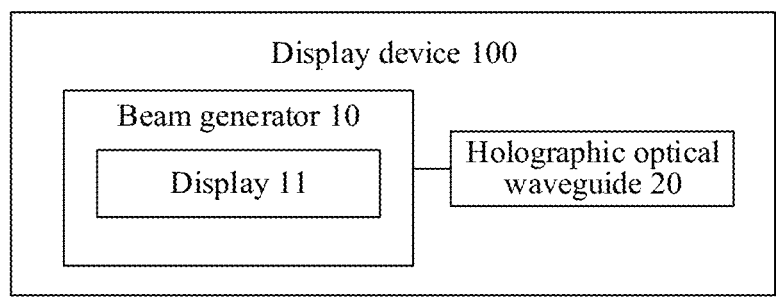
FIG. 2 is a schematic structural diagram of a display device according to an embodiment of the present disclosure.

FIG. 2 is a schematic structural diagram of a display device according to an embodiment of the present disclosure. As shown in FIG. 2, the display device 100 includes: a beam generator 10, including a display 11 and configured to generate beams having image information displayed on the display 11, where a size of the display 11 is a first preset size; and a holographic optical waveguide 20, configured to display an image of a second preset size at a position at a first preset distance behind the display device 100 based on the beams having the image information, where the second preset size is a preset multiple of the first preset size; and the preset multiple is greater than 1. A value of the preset multiple is in a range of 4 to 6, and a value of the first preset distance is in a range of 2500 mm to 3500 mm.

In the related art, a seat display directly adopts a liquid crystal display (which, for example, has a size of 12 inches). A display size is a size of the display (12 inches). Human eyes directly view the display.

Figure 3:
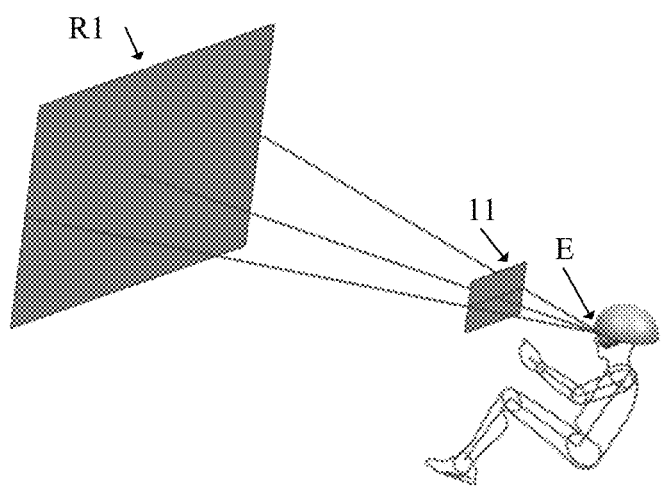
FIG. 3 is a schematic diagram of a size of an image displayed on a display device according to an embodiment of the present disclosure.

Referring to FIG. 3, in the present disclosure, the holographic optical waveguide 20 enables, based on beams having image information displayed on the display 11 (the size of the display 11 is the first preset size, which, for example, is 12 inches) generated by the beam generator 10, human eyes E to view an image R1 of the second preset size (which, for example, is 50 inches) at the first preset distance behind the display device 100. The image of the second preset size is displayed, which increases an image size without occupying more physical space of an entire vehicle. The image is displayed at the first preset distance behind the display device 100, which realizes whole experience like watching a TV series at home, and prevents eye pupils from being kept in a wide-open state that causes discomfort.

In an example, the beam generator 10 further includes a light source 12, a condenser plate 13, a diffusion plate 14, and a collimating lens 15 arranged/disposed in sequence. The display 11 is arranged/disposed between the diffusion plate 14 and the collimating lens 15.

Figure 4:
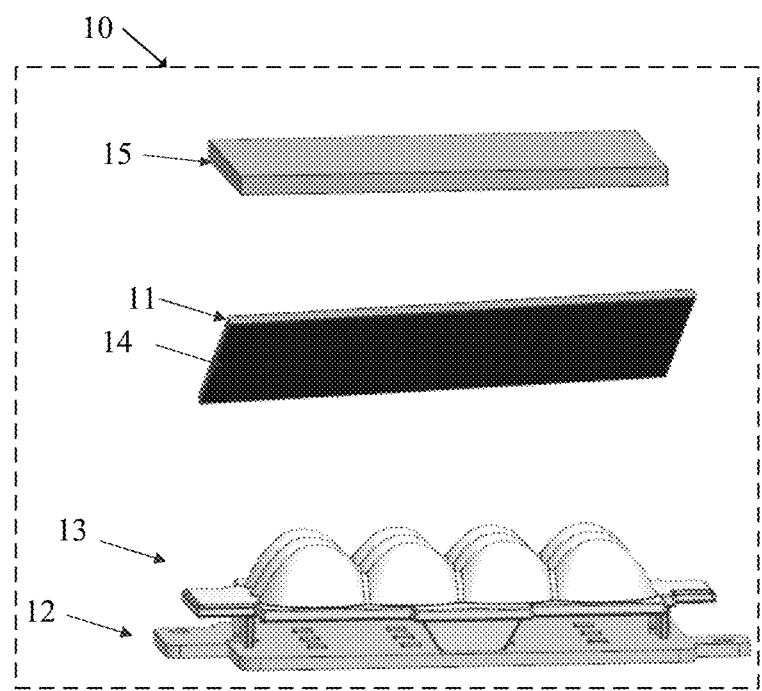
FIG. 4 is a schematic structural diagram of a beam generator according to an embodiment of the present disclosure.

In an embodiment, in a traditional solution, a light-emitting diode (LED) lightens a liquid crystal display of 12 inches by using a light guide plate, and the human eyes directly view the display. Referring to FIG. 4, in the present disclosure, the light source 12 is evenly diffused through the condenser plate 13 and the diffusion plate 14, and lightens a small-size display 11 (which, for example, has a size of 5 inches), and the beams having the image information displayed on the display 11 is then obtained through the collimating lens 15. The light source 12 includes an LED light source, a laser source, or a micro light-emitting diode (micro LED) light source. The condenser plate 13 includes a condenser lens or a reflecting mirror. The display 11 is small and is a non-exterior display. The display 11 includes a thin film transistor (TFT) display, a digital light processing (DLP) display, a liquid crystal on silicon (LCOS) display, or an organic light-emitting diode (OLED) display. To reduce a volume of the beam generator 10 and improve the display of colors, the OLED display may be further used.

In an embodiment, the holographic optical waveguide 20 may include: an optical waveguide coupling-in structure 21, configured to couple in the beams having the image information and propagate the beams having the image information to an optical waveguide coupling-out structure 22. The optical waveguide coupling-out structure 22 is configured to couple out the beams having the image information to display an image of the second preset size at the first preset distance behind the display device 100. The beams having the image information are parallel beams. The beam generator 10 is arranged/disposed directly facing the optical waveguide coupling-in structure 21. The optical waveguide coupling-in structure 21 and the optical waveguide coupling-out structure 22 are arranged in the same plane.

Figure 5:
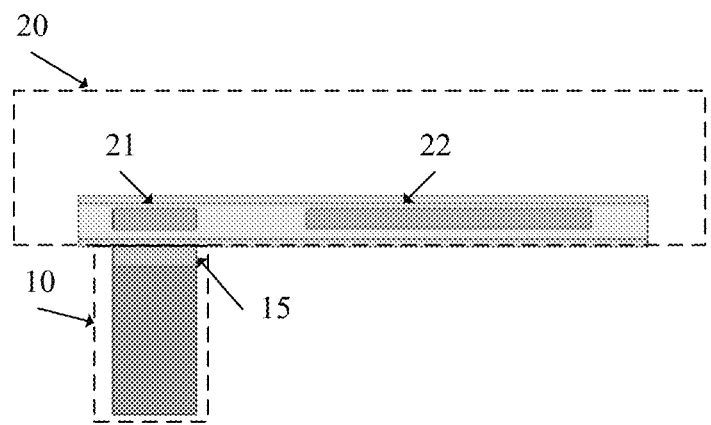
FIG. 5 is a schematic structural diagram of a holographic optical waveguide according to an embodiment of the present disclosure.
Figure 6:
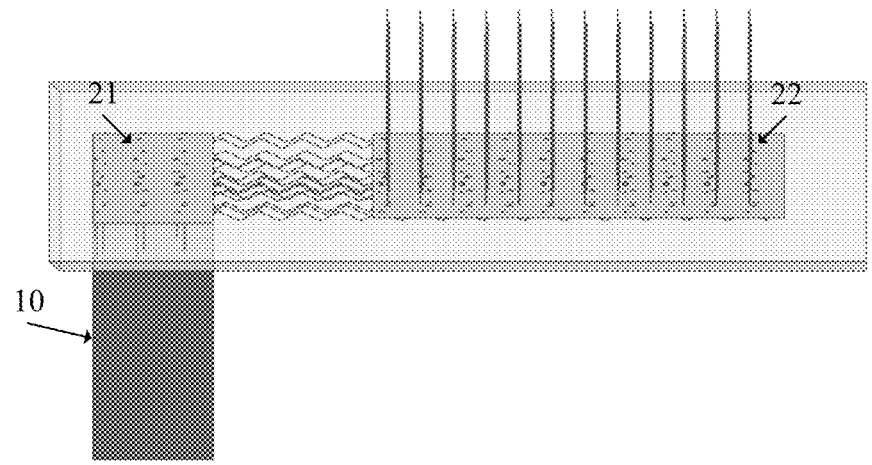
FIG. 6 is a schematic diagram of lights of a holographic optical waveguide according to an embodiment of the present disclosure.

In an embodiment, referring to FIG. 5 and FIG. 6, the beams having the image information displayed on the display 11 and generated by the beam generator 10 enters the optical waveguide coupling-in structure 21 using a holographic grating, pass through the optical waveguide coupling-out structure 22 using a holographic grating, and finally forms an image of the second preset size at the first preset distance behind the display device 100. The image of the size of the display 11, that is, the first preset size (for example, 12 inches) is magnified to the second preset size (for example, 50 inches) based on recording and imaging principles of the holographic grating, so that the human eyes E view the image of the second preset size.

It should be noted that a function of the optical waveguide is to propagate the light information in the waveguide. The light information is conducted from one end of the waveguide to the other end, but does not come out of an interface. The holographic grating is realized through interference manufacturing and diffractive reproduction, and then the holographic grating is attached to a surface of the optical waveguide to break an original interface rule of total reflection, so as to change a direction and energy of the light information propagation. In this way, the light information is transmitted into the human eye from inside of the waveguide.

In an embodiment, the optical waveguide coupling-out structure 22 includes a holographic plate 221. The holographic plate 221 has light information of object light and reference light pre-recorded therein. Distances from the object light and the reference light to the holographic plate 221, the preset multiple, and the first preset distance meet the following formulas:

$$M = \left|1 - \frac{lo}{lr}\right|^{-1}$$

and $1/l_i=1/l_o-1/l_r$ is the preset multiple $l_o$ and $l_r$ are respectively the distances from the object light and the reference light to the holographic plate 221. $L_I$ is the first preset distance.

Figure 7:
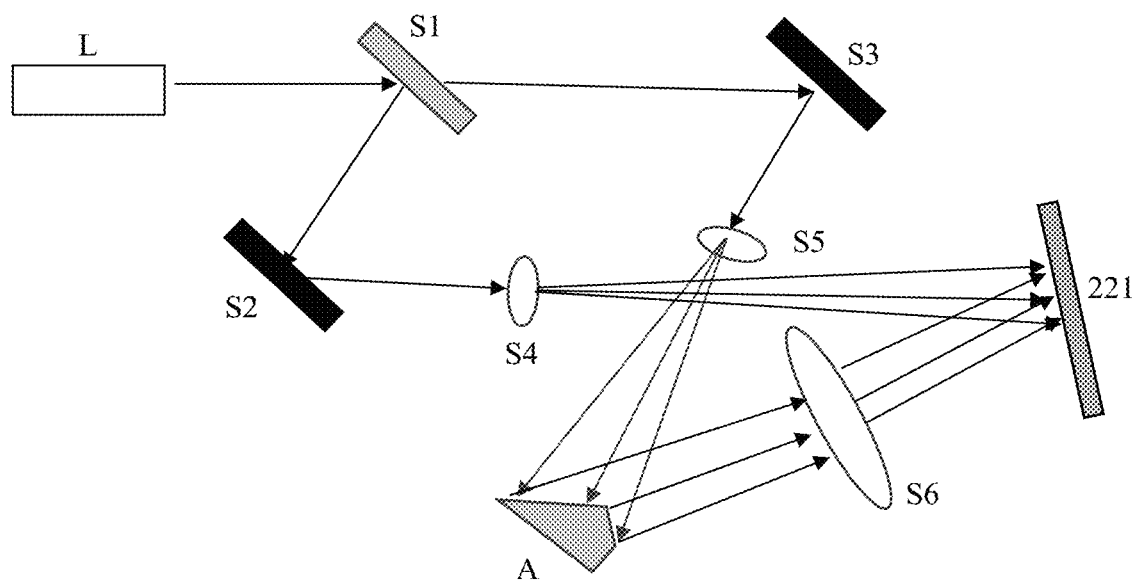
FIG. 7 is a schematic diagram in which a holographic plate records light information of object light and reference light according to an embodiment of the present disclosure.

Recording and imaging principles of the holographic plate 221 are described below with reference to FIG. 7 and FIG. 8.

The principles are as follows. Referring to FIG. 7, a spectroscope S1 is configured to split a laser emitted by a laser device L into two lasers to produce interferential light and coherent light. A reflecting mirror S2 and a reflecting mirror S3 are configured to fold an optical path. A beam expander S4 and a beam expander S5 are configured to diffuse the condensed laser into a large-area light source, to illuminate an entire object A. A magnifying lens S6 is configured to image the image of the second preset size that is a magnified image of the object A to a position at a first preset distance behind the display device 100. The holographic plate 221 is configured to record light information of object light O and reference light R.

Figure 8:
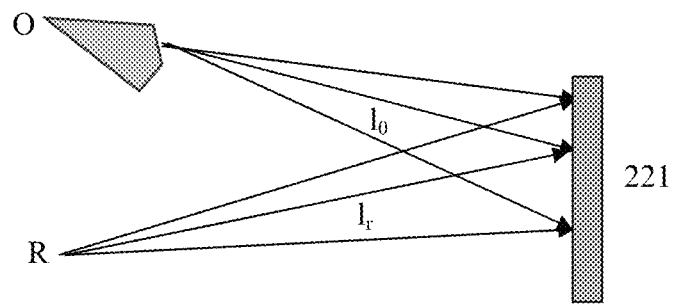
FIG. 8 is a schematic diagram of distances from object light and reference light to a holographic plate according to an embodiment of the present disclosure.

Referring to FIG. 8, an imaging position of the object A passing through the magnifying lens S6 is a position of the object light O, and a position of the beam expander S4 is a position of the reference light R. The object light O and the reference light R are both coherent light. An expression of the object light O(x, y) and an expression R(x, y) of the reference light are respectively shown in a formula (1) and a formula (2):

$$O(x, y) = O_o(x, y) \exp[j\varnothing_o(x, y), \quad (1)$$

$$R(x, y) = R_o(x, y) \exp[j\varnothing_r(x, y)], \quad (2)$$

where $O_o$ and $\varnothing_o$ are respectively an amplitude and a phase of the object light O when reaching the holographic plate 221, and $R_o$ and $\varnothing_r$ are respectively an amplitude and a phase of the reference light R when reaching the holographic plate 221.

An amplitude of an interference field is a coherent superposition of the object light and the reference light, as shown in a formula (3):

$$U(x, y) = O(x, y) + R(x, y). \quad (3)$$

An exposure light intensity recorded by the holographic plate 221 is shown in a formula (4):

$$I(x, y) = U(x, y) * U^*(x, y) = |O|^2 + |R|^2 + O*R^* + O^**R, \quad (4)$$

where $U^*(x, y)$ is a conjugate of $U(x, y)$, $R^*$ is a conjugate of R, and $O^*$ is a conjugate of O.

Figure 9:
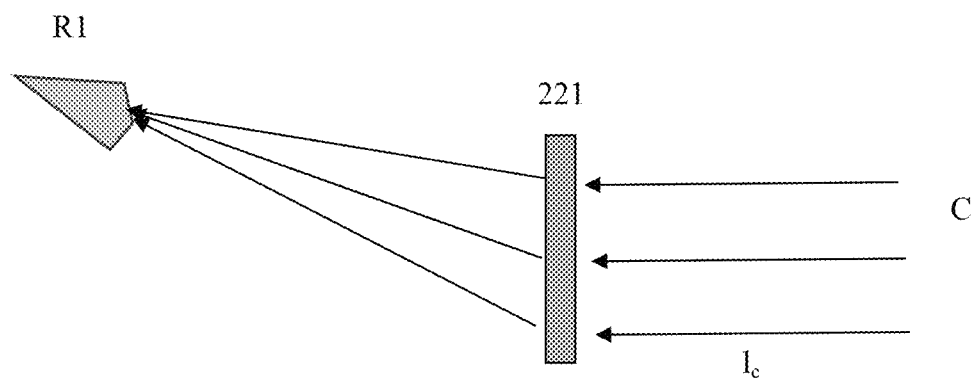
FIG. 9 is a schematic diagram of reproduced light of a holographic plate according to an embodiment of the present disclosure.

Referring to FIG. 9, reproduced light C emitted from the collimating lens 15 in the beam generator 10 lightens the holographic plate 221 that freezes the foregoing information. An expression C(x, y) of the reproduced light C is shown in a formula (5), and an expression U'(x, y) of the reproduced light C after passing through holographic plate 221 is shown in a formula (6):

$$C(x, y) = C_o(x, y) \exp[j\varnothing_c(x, y)], \quad (5)$$

$$U_r(x, y) = C(x, y) * I(x, y), \quad (6)$$

$$U'(x, y) = C_o(x, y) \exp[j\varnothing_c(x, y)] * [|O|^2 + |R|^2 + O*R^* + O^**R] = \quad (7)$$

$$C_o O_O^2 \exp[j\varnothing_c(x, y)] + C_o R_O^2 \exp[j\varnothing_c(x, y)] +$$

$$C_o O_o R_o \exp[j(\varnothing_o - \varnothing_r + \varnothing_c)] + C_o O_o R_o \exp[-j(\varnothing_o - \varnothing_r - \varnothing_c)].$$

A first term and a second term of the formula (7) are similar to the reproduced light C(x, y), but have different amplitudes. Therefore, the terms propagate in the same way as the reproduced light C. A third term includes phase information of the object A and additional information, which is most likely to reproduce the object light O. A fourth term includes information about a conjugate phase of the object A, which is most likely to form a conjugate image. When the reproduced light C is the same as the reference light R (to be specific, $\varnothing_r=\varnothing_c$), the third item is the phase information of the object, and therefore the reproduced object light O is a virtual image C. When the reproduced light C is conjugated with the reference light R (to be specific, $\varnothing_r=-\varnothing_c$), the fourth term is a real image R1 of the object, in which case an inversion of a depth of field is performed, that is, a near site is transformed into a far site. When the reproduced light C is different from and is not conjugated with the reference light R (to be specific, $\varnothing_r \neq \pm\varnothing_c$), the third term is equivalent to a thin lens, which may be zoomed in or out.

It should be noted that in the present disclosure, amplified light information of the reflecting mirror or the lens is pre-recorded on the holographic plate 221 by using a photosensitive material, and the lens or the reflecting mirror is not required during the reproduction. In other words, the recording process and the imaging process of the holographic plate 221 in FIG. 7 and FIG. 8 are completed before the display device 100 starts operating. Therefore, only a thickness in a range of 1.5 mm to 2.5 mm is required for the holographic optical waveguide 20 for optical path recording, which reduces imaging space occupied by the reflecting mirror or the lens.

Referring to FIG. 8 and FIG. 9, $l_o$, $l_c$, and $l_r$ are respectively distances from the object light O, the reproduced light C, and the reference light R to the holographic plate 221. $L_I$ is the first preset distance to the image at the position behind the display device 100.

$$\frac{1}{l_i} - \frac{1}{l_c} = \mu\left(\frac{1}{l_o} - \frac{1}{l_r}\right), \quad (8)$$

$$\mu = \frac{\lambda}{\lambda_o}, \quad (9)$$

$$\frac{x_i}{l_i} - \frac{x_c}{l_c} = \mu\left(\frac{x_o}{l_o} - \frac{x_r}{l_r}\right), \quad (10)$$

$$\frac{y_i}{l_i} - \frac{y_c}{l_c} = \mu\left(\frac{y_o}{l_o} - \frac{y_r}{l_r}\right). \quad (11)$$

An object-image relationship of an ordinary lens is shown in a formula (12) and a formula (13):

$$\frac{1}{l_i} - \frac{1}{l_c} = \frac{1}{f'}, \qquad (12)$$

$$\mu\left(\frac{1}{l_o} - \frac{1}{l_r}\right) = \frac{1}{f'}. \qquad (13)$$

The magnification M is shown in a formula (14):

$$M = \frac{\Delta y_i}{y_o} = \left|1 - \frac{l_o}{l_r} \pm \frac{l_o}{\mu l_c}\right|^{-1}. \qquad (14)$$

In the present disclosure, the beam generator 10 may further include a collimating lens 15 arranged/disposed at an end, so that the reproduced light C becomes parallel light with an infinite range. When the distance $l_c$ from the reproduced light C to the holographic plate 221 is ∞, the formula (14) is $$M = \left|1 - \frac{l_o}{l_r}\right|^{-1}.$$

When a target magnification is 10, that is, the magnification M=10, the distance between the reference light R and the holographic plate 221 is $l_r$=1.11*$l_o$. In this way, the image can be magnified from 5 inches to 50 inches.

It should be noted that configuration may also be performed according to the foregoing principles based on other requirements. For example, to implement magnification of the image from 5 inches to 50 inches (in other words, the magnification M=10) at the imaging distance (that is, the first preset distance) of 3 meters, when a wavelength of the reproduced light C is the same as that of the reference light R, to be specific, $l_i$=3000 mm and $l_c$ is ∞, f'=3000 mm is obtained based on the formula (12) and the formula (13), and $l_o$=297.3 mm and $l_r$=330 mm are further obtained based on $l_r$=1.11*$l_o$. In addition, different systems can implement different magnifications and imaging at different distances, which is related to a design goal, but a principle and a method are the same.

Based on the above, through the display device 100, the imaging distance can be increased, so that eye pupils do not need to be kept in a wide-open state that causes discomfort, which avoids fatigue and myopia; and experience like watching a TV series at home is realized. In addition, since a resulting image is a virtual image that does not need to be received by a receiving screen, the image can be seen directly at a corresponding position in the air. Therefore, an image size can be increased without occupying more physical space of an entire vehicle, and a problem that a large-size display cannot be placed in a physical space is solved. Moreover, even if a seat exists in the physical space, neither the image is blocked nor an imaging brightness is reduced.

Figure 10:
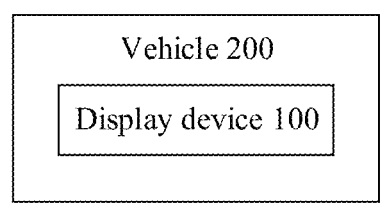
FIG. 10 is a schematic structural diagram of a vehicle according to an embodiment of the present disclosure.
Figure 11:
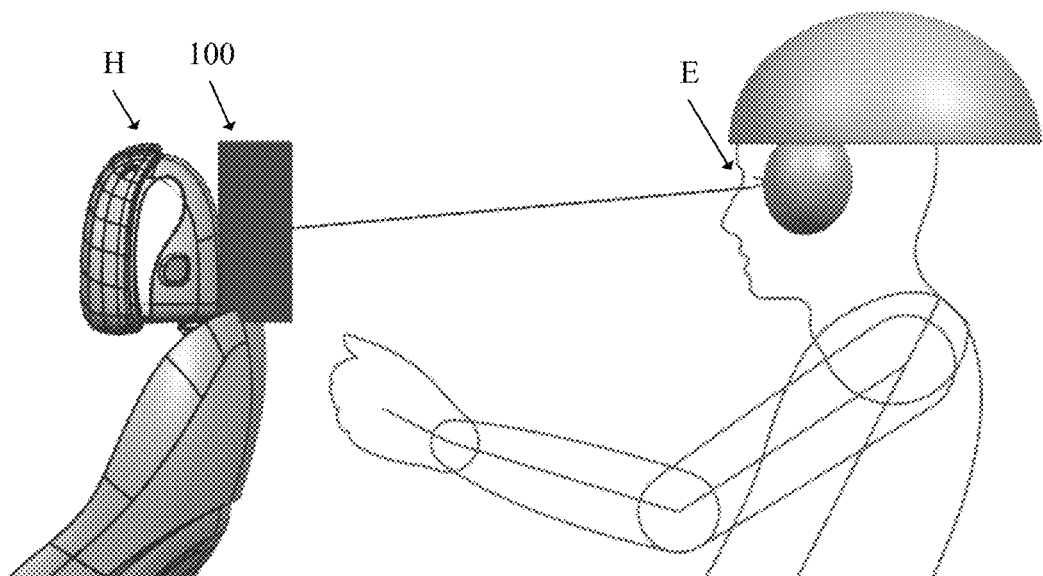
FIG. 11 is a schematic diagram in which a display device is arranged on a headrest of a front seat according to an embodiment of the present disclosure.
Figure 12:
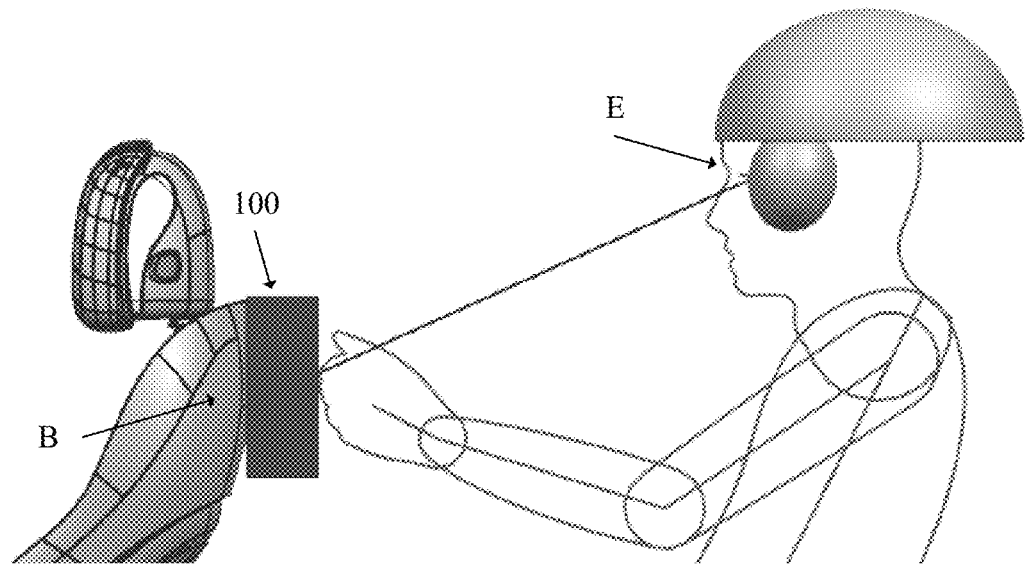
FIG. 12 is a schematic diagram in which a display device is arranged on back of a front seat according to an embodiment of the present disclosure.

FIG. 10 is a schematic structural diagram of a vehicle according to an embodiment of the present disclosure. As shown in FIG. 10, the vehicle 200 includes the foregoing display device 100. In an embodiment, referring to FIG. 11 and FIG. 12, the display device 100 is arranged/disposed at a position H on a headrest or a position B on a back of a front seat of the vehicle 200. A best position of the display device 100 is mainly determined through a human-machine check of the entire vehicle, a visual check by the human eyes E, and a comfortability check.

Based on the above, according to the vehicle 200, through the display device 100, eye pupils do not need to be kept in a wide-open state that causes discomfort, which avoids fatigue and myopia. Experience like watching a TV series at home can be realized, and an image size can be increased without occupying more physical space of an entire vehicle.

Figure 13:
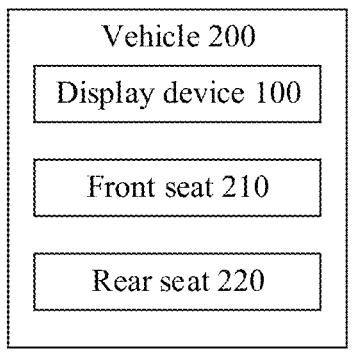
FIG. 13 is a structural schematic diagram of a vehicle according to another embodiment of the present disclosure.
Figure 14:
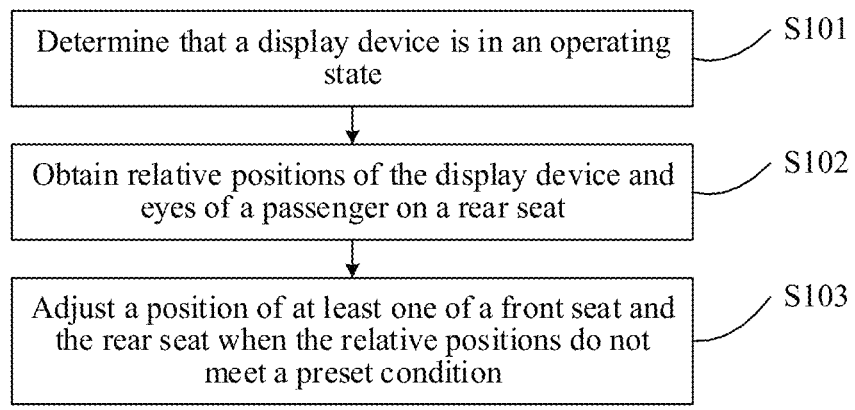
FIG. 14 is a schematic flowchart of a method for controlling a vehicle according to an embodiment of the present disclosure.

FIG. 14 is a schematic flowchart of a method for controlling a vehicle according to an embodiment of the present disclosure. Referring to FIG. 13, a vehicle 200 includes a front seat 210, a rear seat 220, and the foregoing display device 100. The display device 100 is arranged at a position on headrest or a position on a back of the front seat 210. As shown in FIG. 14, the method for controlling a vehicle includes the following steps.

S101: It is determined that the display device 100 is in an operating state.

S102: Relative positions of the display device 100 and eyes of a passenger on the rear seat 220 are obtained.

S103: A position of at least one of the front seat 210 and the rear seat 220 is adjusted when the relative positions do not meet a preset condition, so that the human may watch the holographic image comfortably.

In an embodiment, since the seat has an angle and an up-down position adjustment range, but the imaging position is a fixed field of view, the holographic optical waveguide 20 needs to be adjusted by using the motor to maintain the relative positions unchanged.

It should be noted that, for other implementations of the method for controlling a vehicle in this embodiment of the present disclosure, reference may be to the implementations of the display device 100 in the embodiments of the present disclosure.

Based on the above, according to a method for controlling a vehicle, eye pupils do not need to be kept in a wide-open state that causes discomfort, which avoids fatigue and myopia; experience like watching a TV series at home can be realized; and an image size can be increased without occupying more physical space of an entire vehicle.

It should be noted that, the logic and/or steps shown in the flowchart or described in other manners herein, for example, may be regarded as a sequence list of executable instructions for implementing logical functions, which may be implemented in any computer-readable medium for use by or in combination with an instruction execution system, a device, or an apparatus (such as a computer-based system, a system including a processor, or other systems that can fetch from an instruction execution system, a device, or an apparatus and execute the instructions). In the specification of this application, the "computer-readable medium" may be any device that can include, store, communicate, propagate, or transmit a program for use by or in combination with an instruction execution system, a device, or an apparatus. More examples (a non-exhaustive list) of the computer-readable storage medium include an electrical connection portion (an electronic device) with one or more wires, a portable computer case (a magnetic device), a random access memory (RAM), a read-only memory (ROM), an erasable programmable read-only memory (EPROM or a flash memory), an optical fiber device, and a portable compact disk read-only memory (CDROM). In addition, the computer-readable medium even may be paper or other suitable media on which the program can be printed, because the program can be obtained electronically, for example, by optically scanning the paper or the other media, then performing editing, interpreting, or processing in other suitable manners if necessary, and then stored in a computer memory.

It should be understood that, parts of the present disclosure may be implemented by using hardware, software, firmware, or a combination thereof. In the foregoing implementations, a plurality of steps or methods may be implemented by using software or firmware stored in a memory and executable by a proper instruction execution system. For example, if hardware is used for implementation, same as another implementation, implementation may be performed by using any of the following technologies well known in the art or a combination thereof: a discrete logic circuit including a logic gate circuit for implementing a logic function of a data signal, a dedicated integrated circuit including a proper combinational logic gate circuit, a programmable gate array (PGA), a field programmable gate array (FPGA), and the like.

In the descriptions of the specification, a description with reference to terms such as "an embodiment", "some embodiments", "an example", "a specific example", or "some examples" means that features, structures, materials, or characteristics described with reference to the embodiment or the example is included in at least one embodiment or example of the present disclosure. In this specification, schematic descriptions of the foregoing terms do not necessarily refer to the same embodiment or example. In addition, the described features, structures, materials, or characteristics may be combined in a proper manner in any one or more embodiments or examples.

In the descriptions of the present disclosure, it should be understood that orientation or position relationships indicated by the terms such as "center", "longitudinal", "transverse", "length", "width", "thickness", "up", "down", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the drawings, and are merely used for ease and brevity of description of the present disclosure, rather than indicating or implying that the mentioned device or element needs to have a particular orientation or be constructed and operated in a particular orientation. Therefore, such terms should not be construed as a limitation on the present disclosure.

In addition, the terms "first" and "second" are merely used for description, and shall not be construed as indicating or implying relative importance or implying a quantity of indicated technical features. Therefore, the features defined with "first" and "second" may explicitly or implicitly include at least one of the features. In the descriptions of the present disclosure, unless explicitly specified, "multiple" means at least two, for example, two or three.

In the present disclosure, unless otherwise explicitly specified or defined, the terms such as "mount", "connect", "connection", and "fix" should be understood in a broad sense. For example, the connection may be a fixed connection, a detachable connection, or an integral connection; or may be a mechanical connection or an electrical connection; or may be a direct connection, an indirect connection through an intermediate medium, internal communication between two elements, or an interaction relationship between two elements. A person of ordinary skill in the art can understand meanings of the terms in the present disclosure based on situations.

In the present disclosure, unless otherwise explicitly specified and defined, a first feature being "on" or "under" a second feature may mean that the first feature is in direct contact with the second feature, or the first feature is in indirect contact with the second feature by using an intermediate medium. In addition, the first feature being "above", "over", or "on" the second feature may mean that the first feature is directly above or obliquely above the second feature, or may merely mean that the first feature is at a higher horizontal position than the second feature. The first feature being "below", "under", and "beneath" the second feature may mean that the first feature is directly below or obliquely below the second feature, or merely mean that the first feature is at a lower horizontal position than the second feature.

Although the embodiments of the present disclosure have been shown and described above, it can be understood that, the foregoing embodiments are examples and should not be understood as a limitation on the present disclosure. A person of ordinary skill in the art can make changes, modifications, replacements, or variations to the foregoing embodiments within the scope of the present disclosure.

What is claimed is:

1. A display device, comprising:
a beam generator, comprising a display and configured to generate beams having image information displayed on the display, wherein the display has a first size; and
a holographic optical waveguide, configured to display an image of a second size at a position at a first distance behind the display device based on the beams having the image information, wherein the second size is a multiple of the first size; and the multiple is greater than 1, wherein:
the holographic optical waveguide comprises an optical waveguide coupling-in structure and an optical waveguide coupling-out structure; the optical waveguide coupling-out structure comprises a holographic plate; light information of object light and reference light are pre-recorded on the holographic plate; and distances from the object light and the reference light to the holographic plate, the multiple, and the first distance meet following formulas:

$$M = |1 - l_o/l_r|^{-1},$$
$$1/l_i = 1/l_o - 1/l_r,$$

wherein M is the multiple; $l_o$ is a distances from the object light to the holographic plate; $l_r$ is a distance from the reference light to the holographic plate; and $l_i$ is the first distance.

2. The display device according to claim 1, wherein:
the optical waveguide coupling-in structure is configured to couple in the beams having the image information and propagate the beams having the image information to the optical waveguide coupling-out structure; and
the optical waveguide coupling-out structure is configured to couple out the beams having the image information to display the image of the second size.

3. The display device according to claim 2, wherein the beam generator is disposed directly facing the optical waveguide coupling-in structure; and the optical waveguide coupling-in structure and the optical waveguide coupling-out structure are disposed in a same plane.

4. The display device according to claim 2, wherein the beams having the image information are parallel beams.

5. The display device according to claim 1, wherein the beam generator further comprises a light source, a condenser plate, a diffusion plate, and a collimating lens, and the display is disposed between the diffusion plate and the collimating lens.

6. The display device according to claim 5, wherein the light source comprises a light-emitting diode (LED) light source, a laser source, or a micro light-emitting diode (micro LED) light source; the condenser plate comprises a condenser lens or a reflecting mirror; and the display comprises a thin film transistor display, a digital light procession display, a liquid crystal on silicon display, or an organic light-emitting diode display.

7. The display device according to claim 1, wherein the multiple is in a range of 4 to 6; the first distance is in a range of 2500 mm to 3500 mm; and a thickness of the holographic optical waveguide is in a range of 1.5 mm to 2.5 mm.

8. A vehicle, comprising a display device, comprising:
a beam generator, comprising a display and configured to generate beams having image information displayed on the display, wherein the display has a first size; and
a holographic optical waveguide, configured to display an image of a second size at a position at a first distance behind the display device based on the beams having the image information, wherein the second size is a multiple of the first size; and the multiple is greater than 1, wherein:
the holographic optical waveguide comprises an optical waveguide coupling-in structure and an optical waveguide coupling-out structure; the optical waveguide coupling-out structure comprises a holographic plate; light information of object light and reference light are pre-recorded on the holographic plate; and distances from the object light and the reference light to the holographic plate, the multiple, and the first distance meet following formulas:

$$M = |1 - l_o/l_r|^{-1},$$
$$1/l_i = 1/l_o - 1/l_r,$$

wherein M is the multiple; $l_o$ is a distances from the object light to the holographic plate; $l_r$ is a distance from the reference light to the holographic plate; and $l_f$ is the first distance.

9. The vehicle according to claim 8, wherein:
the optical waveguide coupling-in structure is configured to couple in the beams having the image information and propagate the beams having the image information to the optical waveguide coupling-out structure; and
the optical waveguide coupling-out structure is configured to couple out the beams having the image information to display the image of the second size.

10. The vehicle according to claim 9, wherein the beam generator is disposed directly facing the optical waveguide coupling-in structure; and the optical waveguide coupling-in structure and the optical waveguide coupling-out structure are disposed in a same plane.

11. The vehicle according to claim 9, wherein the beams having the image information are parallel beams.

12. The vehicle according to claim 8, wherein the beam generator further comprises a light source, a condenser plate, a diffusion plate, and a collimating lens, and the display is disposed between the diffusion plate and the collimating lens.

13. The vehicle according to claim 12, wherein the light source comprises a light-emitting diode (LED) light source, a laser source, or a micro light-emitting diode (micro LED) light source; the condenser plate comprises a condenser lens or a reflecting mirror; and the display comprises a thin film transistor display, a digital light procession display, a liquid crystal on silicon display, or an organic light-emitting diode display.

14. The vehicle according to claim 8, wherein the multiple is in a range of 4 to 6; the first distance is in a range of 2500 mm to 3500 mm; and a thickness of the holographic optical waveguide is in a range of 1.5 mm to 2.5 mm.

15. The vehicle according to claim 8, wherein the display device is disposed on a headrest or a back of a front seat of the vehicle.

16. A method for controlling a vehicle, the vehicle comprising a front seat, a rear seat, and a display device,
the display device being disposed on a headrest or a back of the front seat, and comprising:
a beam generator, comprising a display and configured to generate beams having image information displayed on the display, wherein the display has a first size; and
a holographic optical waveguide, configured to display an image of a second size at a position at a first distance behind the display device based on the beams having the image information, wherein the second size is a multiple of the first size; and the multiple is greater than 1; and
the method comprising:
determining that the display device is in an operating state;
obtaining relative positions of the display device and eyes of a passenger on the rear seat according to positions and angles of the front seat and the rear seat; and
when the relative positions do not meet a condition, adjusting a position of at least one of the front seat and the rear seat.

17. The method according to claim 16, wherein the holographic optical waveguide comprises:
an optical waveguide coupling-in structure, configured to couple in the beams having the image information and propagate the beams having the image information to an optical waveguide coupling-out structure; and
the optical waveguide coupling-out structure, configured to couple out the beams having the image information to display the image of the second size.

18. The method according to claim 17, wherein the beam generator is disposed directly facing the optical waveguide coupling-in structure; and the optical waveguide coupling-in structure and the optical waveguide coupling-out structure are disposed in a same plane.

19. The method according to claim 17, wherein the beams having the image information are parallel beams; the optical waveguide coupling-out structure comprises a holographic plate; light information of object light and reference light are pre-recorded on the holographic plate; and distances from the object light and the reference light to the holographic plate, the multiple, and the first distance meet following formulas:

$$M = |1 - l_o/l_r|^{-1},$$
$$1/l_i = 1/l_o - 1/l_r,$$

wherein M is the multiple; $l_o$ is a distances from the object light to the holographic plate; $l_r$ is a distance from the reference light to the holographic plate; and $l_f$ is the first distance.

20. The method according to claim 16, wherein when the relative positions do not meet the condition, adjusting a position of the holographic optical waveguide.

\* \* \* \* \*